US012792695B2

(12) United States Patent
Gullett

(10) Patent No.: US 12,792,695 B2
(45) Date of Patent: Nov. 10, 2026

(54) SYSTEMS AND METHODS FOR STREAMLINED TRAINING

(71) Applicant: PhishingBox, LLC, Lexington, KY (US)

(72) Inventor: Thomas Chase Gullett, Lexington, KY (US)

(73) Assignee: PhishingBox, LLC, Lexington, KY (US)

( * ) Notice: Subject to any disclaimer, the term of this patent is extended or adjusted under 35 U.S.C. 154(b) by 29 days.

(21) Appl. No.: 19/016,954

(22) Filed: Jan. 10, 2025

(65) Prior Publication Data

US 2025/0238486 A1 Jul. 24, 2025

Related U.S. Application Data

(60) Provisional application No. 63/624,331, filed on Jan. 24, 2024.

(51) Int. Cl.

| | |
|---|---|
| ***G06F 21/31*** | (2013.01) |
| ***G06F 21/10*** | (2013.01) |
| ***G06F 21/41*** | (2013.01) |
| ***G06F 21/62*** | (2013.01) |
| ***H04L 9/40*** | (2022.01) |

(52) U.S. Cl.

CPC ............ *G06F 21/105* (2013.01); *G06F 21/31* (2013.01); *G06F 21/41* (2013.01); *G06F 21/62* (2013.01); *H04L 63/102* (2013.01)

(58) Field of Classification Search

CPC ........ G06F 21/105; G06F 21/31; G06F 21/41; G06F 21/62; H04L 63/102

See application file for complete search history.

(56) References Cited

U.S. PATENT DOCUMENTS

| | | | | |
|---|---|---|---|---|
| 8,764,455 | B1 * | 7/2014 | Morrison | G09B 17/003 434/323 |
| 8,834,175 | B1 * | 9/2014 | Daddi | G09B 7/02 434/350 |
| 9,218,128 | B1 * | 12/2015 | Yuschik | G09B 19/0053 |
| 9,736,169 | B2 * | 8/2017 | Addala | H04L 63/0853 |

(Continued)

FOREIGN PATENT DOCUMENTS

| | | | |
|---|---|---|---|
| CN | 103631579 | A | 3/2014 |
| CN | 114661391 | A | 6/2022 |

*Primary Examiner* — David Garcia Cervetti

(74) *Attorney, Agent, or Firm* — Dinsmore & Shohl LLP

(57) ABSTRACT

Embodiments for streamlined training are provided. One embodiment of a method includes granting a user with access to an organization-managed device, determining that the user has been assigned third party training software, and determining an identifier type for the third party training software. Some embodiments include locating a user identifier associated with another portion of the organization-managed device that complies with the identifier type for the third party training software, automatically and without user intervention using the user identifier to identify the user for the third party training software, and providing a training widget to the user. Some embodiments include determining that the user is deficient on training and in response to determining that the user is deficient on training, physically restricting access to other third party software provided via the organization-managed device.

20 Claims, 13 Drawing Sheets

(56) References Cited

U.S. PATENT DOCUMENTS

| | | | | |
|---|---|---|---|---|
| 10,237,302 | B1 * | 3/2019 | Kras | H04L 63/1483 |
| 10,540,493 | B1 * | 1/2020 | Kras | G06F 21/46 |
| 10,949,760 | B1 * | 3/2021 | Kritzinger | G06F 16/9035 |
| 10,992,818 | B2 * | 4/2021 | Hughes | H04W 4/24 |
| 11,216,273 | B1 * | 1/2022 | Story | G06F 8/71 |
| 11,676,504 | B1 * | 6/2023 | Holt | G06F 16/285 434/353 |
| 11,750,717 | B2 * | 9/2023 | Walsh | G06F 11/2023 709/223 |
| 11,870,806 | B1 * | 1/2024 | Qian | H04L 63/20 |
| 2003/0018725 | A1 * | 1/2003 | Turner | H04L 67/08 709/228 |
| 2003/0073065 | A1 * | 4/2003 | Riggs | H04L 63/08 434/350 |
| 2003/0074558 | A1 * | 4/2003 | Riggs | H04L 63/08 713/168 |
| 2003/0074559 | A1 * | 4/2003 | Riggs | H04L 63/08 713/168 |
| 2004/0224293 | A1 * | 11/2004 | Penning | G09B 5/00 434/219 |
| 2007/0099161 | A1 * | 5/2007 | Krebs | G09B 7/00 434/362 |
| 2007/0122790 | A1 * | 5/2007 | Sperle | G09B 5/00 434/350 |
| 2007/0160962 | A1 * | 7/2007 | Jones | G06F 9/4406 434/118 |
| 2008/0182232 | A1 * | 7/2008 | Bannwolf | G09B 7/02 434/350 |
| 2009/0197234 | A1 * | 8/2009 | Creamer | G09B 7/00 434/350 |
| 2013/0318586 | A1 * | 11/2013 | Smith | G06F 16/907 726/7 |
| 2014/0038163 | A1 * | 2/2014 | Karpoff | G06Q 10/06 434/362 |
| 2014/0199664 | A1 * | 7/2014 | Sadeh-Koniecpol | G06F 21/564 434/118 |
| 2014/0255889 | A1 * | 9/2014 | Grimes | G06Q 30/0207 434/236 |
| 2014/0272894 | A1 * | 9/2014 | Grimes | G06F 21/62 434/350 |
| 2014/0278895 | A1 * | 9/2014 | Grimes | G09B 7/08 726/28 |
| 2014/0377723 | A1 * | 12/2014 | Strong | G09B 7/08 434/118 |
| 2015/0007307 | A1 * | 1/2015 | Grimes | G09B 5/08 726/18 |
| 2015/0194064 | A1 * | 7/2015 | Young | G09B 5/10 434/350 |
| 2016/0006720 | A1 * | 1/2016 | Spaulding | H04L 63/0838 726/8 |
| 2016/0012739 | A1 * | 1/2016 | Jafari | G09B 5/08 709/204 |
| 2016/0071032 | A1 * | 3/2016 | Hunter | G06Q 10/0631 705/7.12 |
| 2016/0328577 | A1 * | 11/2016 | Howley | G06F 1/3209 |
| 2016/0366126 | A1 * | 12/2016 | Sharifi | H04W 12/30 |
| 2017/0005868 | A1 * | 1/2017 | Scheines | H04L 67/52 |
| 2017/0039388 | A1 * | 2/2017 | Vas | H04L 63/107 |
| 2017/0053101 | A1 * | 2/2017 | Booth | G16H 70/20 |
| 2017/0171161 | A1 * | 6/2017 | Johansson | H04L 63/08 |
| 2017/0244746 | A1 * | 8/2017 | Hawthorn | G06F 21/55 |
| 2018/0286267 | A1 * | 10/2018 | Govil | G06T 1/0007 |
| 2018/0337910 | A1 * | 11/2018 | Gustavson | H04L 63/168 |
| 2018/0373994 | A1 * | 12/2018 | Doucette | G06Q 10/1097 |
| 2019/0005428 | A1 * | 1/2019 | Kras | G06Q 10/06314 |
| 2019/0089698 | A1 * | 3/2019 | Mathew | H04L 63/0838 |
| 2019/0089701 | A1 * | 3/2019 | Mercury | G06Q 30/018 |
| 2019/0171934 | A1 * | 6/2019 | Sites | G06N 3/08 |
| 2019/0173915 | A1 * | 6/2019 | Irimie | G06N 3/0499 |
| 2019/0173916 | A1 * | 6/2019 | Irimie | G06F 21/552 |
| 2019/0173918 | A1 * | 6/2019 | Sites | G06N 3/044 |
| 2019/0173919 | A1 * | 6/2019 | Irimie | G06F 21/577 |
| 2019/0291008 | A1 * | 9/2019 | Cox | A63F 13/335 |
| 2019/0377887 | A1 * | 12/2019 | Bedi | H04W 12/08 |
| 2020/0074871 | A1 * | 3/2020 | Zhou | G09B 5/00 |
| 2020/0099716 | A1 * | 3/2020 | Sjouwerman | H04L 63/1466 |
| 2020/0104331 | A1 * | 4/2020 | Azarias | H04L 9/50 |
| 2020/0160458 | A1 * | 5/2020 | Bodin | G06F 8/30 |
| 2020/0177612 | A1 * | 6/2020 | Kras | G06N 20/00 |
| 2020/0226944 | A1 * | 7/2020 | Reilly | G06F 16/2246 |
| 2020/0228424 | A1 * | 7/2020 | Reilly | G06F 16/2246 |
| 2020/0351369 | A1 * | 11/2020 | Walsh | G06F 11/2023 |
| 2020/0382607 | A1 * | 12/2020 | Nealis | G06F 21/10 |
| 2021/0141932 | A1 * | 5/2021 | Barday | G06F 16/125 |
| 2021/0150928 | A1 * | 5/2021 | Hudson | G09B 7/02 |
| 2021/0234849 | A1 * | 7/2021 | Lamb | H04L 63/04 |
| 2021/0272473 | A1 * | 9/2021 | Boskovic | G06F 21/57 |
| 2021/0344713 | A1 * | 11/2021 | Kras | H04L 51/046 |
| 2021/0367970 | A1 * | 11/2021 | Carpenter | H04L 63/1408 |
| 2022/0012348 | A1 * | 1/2022 | Kirkwood | G06F 21/602 |
| 2022/0038498 | A1 * | 2/2022 | Kras | H04L 63/1483 |
| 2022/0139252 | A1 * | 5/2022 | Sawyer | G09B 9/165 |
| 2022/0191233 | A1 * | 6/2022 | Kras | G06F 21/6245 |
| 2022/0245539 | A1 * | 8/2022 | Clearwater | G06F 16/958 |
| 2022/0358427 | A1 * | 11/2022 | Brannon | G06F 21/577 |
| 2022/0375015 | A1 * | 11/2022 | Botteril | G09B 5/12 |
| 2022/0377101 | A1 * | 11/2022 | Kras | H04L 63/1483 |
| 2022/0406207 | A1 * | 12/2022 | Celano | G09B 5/02 |
| 2023/0038258 | A1 * | 2/2023 | Patton | G06Q 10/10 |
| 2023/0081399 | A1 * | 3/2023 | Murphy | G06Q 10/06395 705/7.42 |
| 2023/0164166 | A1 * | 5/2023 | Patton | H04L 63/1433 726/25 |
| 2023/0169439 | A1 * | 6/2023 | Callihan | G06Q 10/06398 705/7.42 |
| 2023/0222184 | A1 * | 7/2023 | Safronoff | G06F 18/2178 706/15 |
| 2024/0005430 | A1 * | 1/2024 | Shetty | G06Q 50/2057 |
| 2024/0062667 | A1 * | 2/2024 | Kemble | G06F 18/22 |
| 2024/0096234 | A1 * | 3/2024 | Brennan | G09B 19/0053 |
| 2025/0062904 | A1 * | 2/2025 | Bhasin | G06F 21/33 |
| 2025/0182136 | A1 * | 6/2025 | Lynn | G06Q 30/016 |
| 2025/0258975 | A1 * | 8/2025 | Basu | G06F 30/20 |
| 2026/0161810 | A1 * | 6/2026 | Ruter | G06F 21/6209 |

* cited by examiner

SYSTEMS AND METHODS FOR STREAMLINED TRAINING

CROSS REFERENCE

This application claims the benefit of U.S. Provisional Application Ser. No. 63/624,331 filed on Jan. 24, 2024, which is hereby incorporated by reference in its entirety.

TECHNICAL FIELD

Embodiments described herein generally relate to systems and methods for streamlined training and, more specifically, to seamless authentication of users of electronic training platforms.

BACKGROUND

In online training industry, there are several issues that revolve around the accessibility and user-friendliness of training programs. One common challenge is that these training initiatives tend to be unnecessarily cumbersome and often hidden behind barriers, primarily in the form of mandatory logins. This problem manifests via complexity, restricted access, data privacy issues, increased time consumption, and disengagement.

Specifically, many training programs are needlessly complex, making it difficult for learners to navigate through the materials effectively. Overly complicated interfaces and convoluted content structures can hinder the learning process and deter participation. Regarding restricted access, many current solutions have a requirement for logins or user accounts that creates a barrier to entry for individuals who could benefit from the training. This exclusivity limits the reach of valuable knowledge and deprives potential learners of opportunities for growth. Regarding data privacy, the need to create accounts and provide personal information raises concerns about data privacy and security. Users may be hesitant to share data, especially when they are unsure about the purpose of collecting such information. These logins also often add an unnecessary step that consumes valuable time. Users may be reluctant to engage in training if they perceive it as a time-consuming process. Additionally, the cumbersome training experiences can lead to disengagement and a lack of motivation among learners. When accessing training materials becomes an arduous task, it diminishes the enthusiasm and willingness to participate. Thus, a need exists in the industry for systems and methods for streamlined training.

SUMMARY

Embodiments for streamlined training are provided. One embodiment of a method includes granting a user with access to an organization-managed device, determining that the user has been assigned third party training software, and determining an identifier type for the third party training software. Some embodiments include locating a user identifier associated with another portion of the organization-managed device that complies with the identifier type for the third party training software, automatically and without user intervention using the user identifier to identify the user for the third party training software, and providing a training widget to the user. Some embodiments include determining that the user is deficient on training and in response to determining that the user is deficient on training, physically restricting access to other third party software provided via the organization-managed device.

Embodiments of a system include a cloud device for providing third party training software to a user and a client device that includes a memory component and a processor, the memory component storing logic that causes the processor to prompt the user for user credentials to access the client device, wherein the user credentials include a user identifier, receive the user credentials, and determine whether the user credentials authenticate the user as an authorized user of the client device. In some embodiments, in response to determining that the user credentials authenticate the user, the logic causes the system to grant the user access to the client device, determine that the user has been assigned third party training software to complete a training program, and automatically and without user intervention, identify the user with the user identifier for using the third party training software. In some embodiments, the logic causes the system to provide a training widget to the user, determine that the user is deficient on training, and in response to determining that the user is deficient on training, physically restrict access to other third party software provided via the client device.

Embodiments of a non-transitory computer-readable storage medium include logic that causes a computing device to determine that a user has been assigned third party training software, determine an identifier type for the third party training software, and locate a user identifier associated with another portion of the organization-managed device that complies with the identifier type for the third party training software. In some embodiments, the logic causes the computing device to identify the user for the third party training software, provide a training widget to the user, and determine that the user is deficient on training. In some embodiments, the logic causes the computing device to physically restrict access to other third party software provided via the organization-managed device in response to determining that the user is deficient on training.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for providing streamlined training. Some embodiments enable the integration of training modules seamlessly into existing websites, intranets, and modern web applications, thereby simplifying user access to educational content. In some embodiments, users may be authenticated using an email address or other user identifier, eliminating the need for additional user accounts, usernames, or passwords. Some embodiments are configured to be easily embedded within various web-based platforms, allowing for versatile deployment. Some embodiments provide a training portal user interface that is customizable to match the visual identity and branding of the host application. Some embodiments provide robust tracking and analytics tools provide real-time insights into user engagement and progress. Embodiments are also scalable to accommodate a range of user numbers, making it suitable for organizations of various sizes.

Similarly, some embodiments include an embedded application provided into a parent application or website that provides the ability to interrupt an end user's workflow to communicate that training is required or that the use needs to complete a required training module, and ultimately, to force a user to take the training if the proper timing is appropriate. Using any of the authentication processes described herein, embodiments may then use two identifiers, a training number and a training email, to return the proper settings and required training for that specific end user.

Embodiments provided herein also include a training wall. If the training is enabled and the user needs to be notified or forced to take training, embodiments may automatically open full screen, ready for the user to take the training, locking the user out of other applications.

As such, embodiments described herein provide online training delivery, which streamlines the user experience and promotes engagement. These embodiments provide a unique combination of user identification, integration flexibility, and customizable design. The systems and methods for providing streamlined training incorporating the same will be described in more detail, below.

Figure 1A:
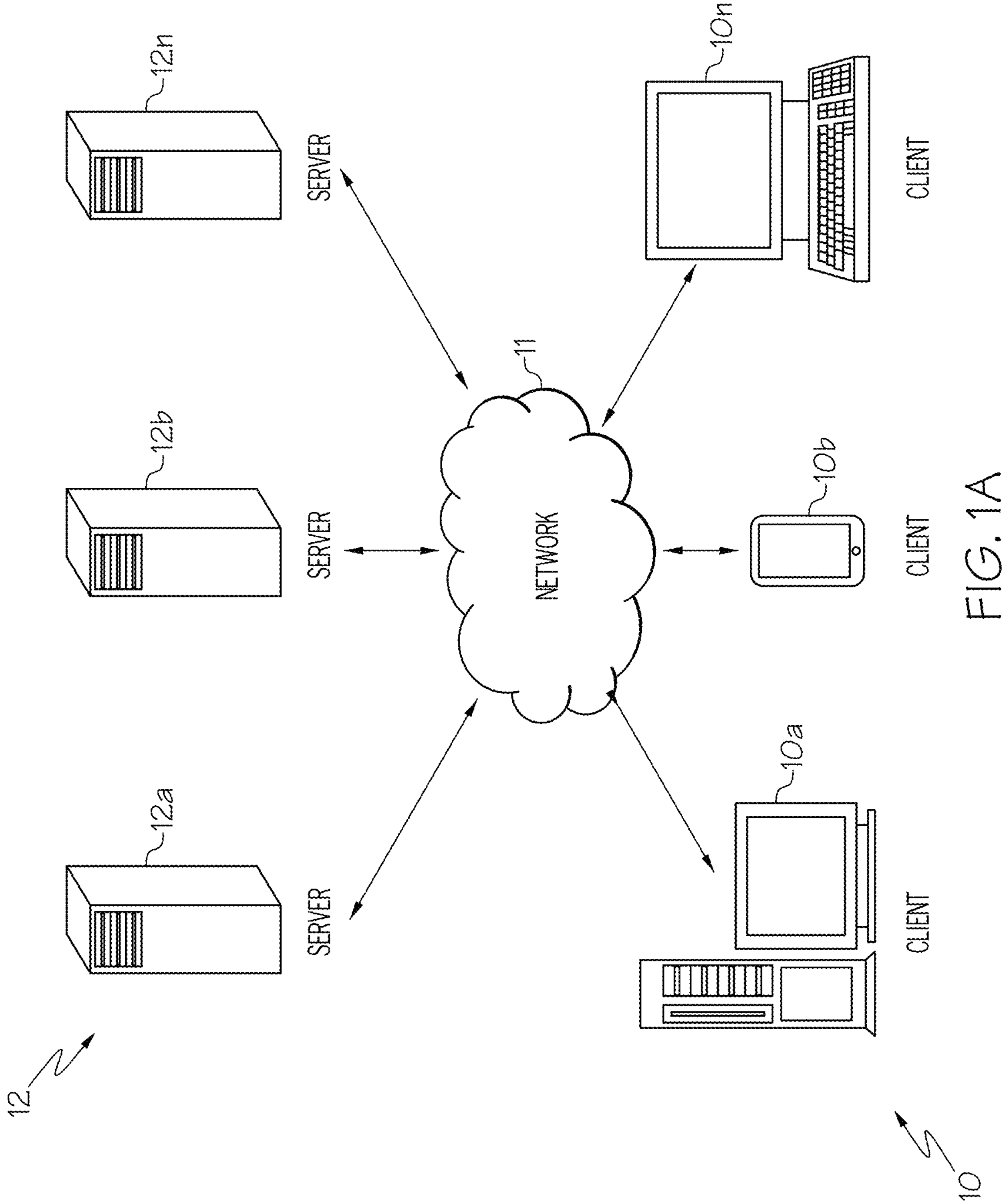
FIG. 1A depicts a network environment for providing streamlined training, according to embodiments provided herein.

Referring now to the drawings, FIG. 1A depicts a network environment for providing streamlined training, according to embodiments provided herein. As illustrated, the network environment may include at least one client device, such as client 10*a*, 10*b*, . . . , 10*n*, a network 11, and at least one server 12*a*, 12*b*, . . . , 12*n*. The network 11 may include any wide area network (WAN), such as the internet, a cellular or mobile network, a satellite network, a public switched telephone network (PSTN), and/or other network for covering a large geographical area and numerous devices. The network 11 may include at least one local area network (LAN), such as via Ethernet, Wireless Fidelity (Wi-Fi), etc. The network 11 may include at least one personal area network (PAN), such as Zigbee, Bluetooth, a wired connection, etc.

Similarly, the client(s) 10 may be configured as a personal computer, mobile device, laptop, server, and/or other computing device that is configured for interacting with a user to provide training. The client 10 may be coupled to the network 11 and receive data from one or more of the servers 12. While three clients 10 are depicted in FIG. 1A, it will be understood that any number may be provided, depending on the particular embodiment.

Server(s) 12 (also referred to herein as the cloud 12 or cloud device) may also be coupled to the network 11 and may include any server, personal computer, laptop, mobile device, or other computing device that can provide training, applications, and/or data to the clients 10 via the network 11. While three servers 12*a*, 12*b*, and 12*n* are depicted in FIG. 1A, as will be understood any number of physical servers, virtual servers, and/or other physical or virtual components may be utilized to provide the functionality provided herein.

Specifically, while the servers 12*a*, 12*b*, and 12*n* may be part of a server farm from a single entity, some embodiments may be configured such that at least one of the servers 12 may be content server of a third party. As an example, some embodiments may be configured to provide training via a first server 12 controlled by a first entity, but the training portal, training wall, etc. may be provided by a second server 12 controlled by a second entity. As such, discussion herein regarding the servers 12 and/or the cloud 12 may refer to any remotely located resource for providing the functionality described herein.

Figure 1B:
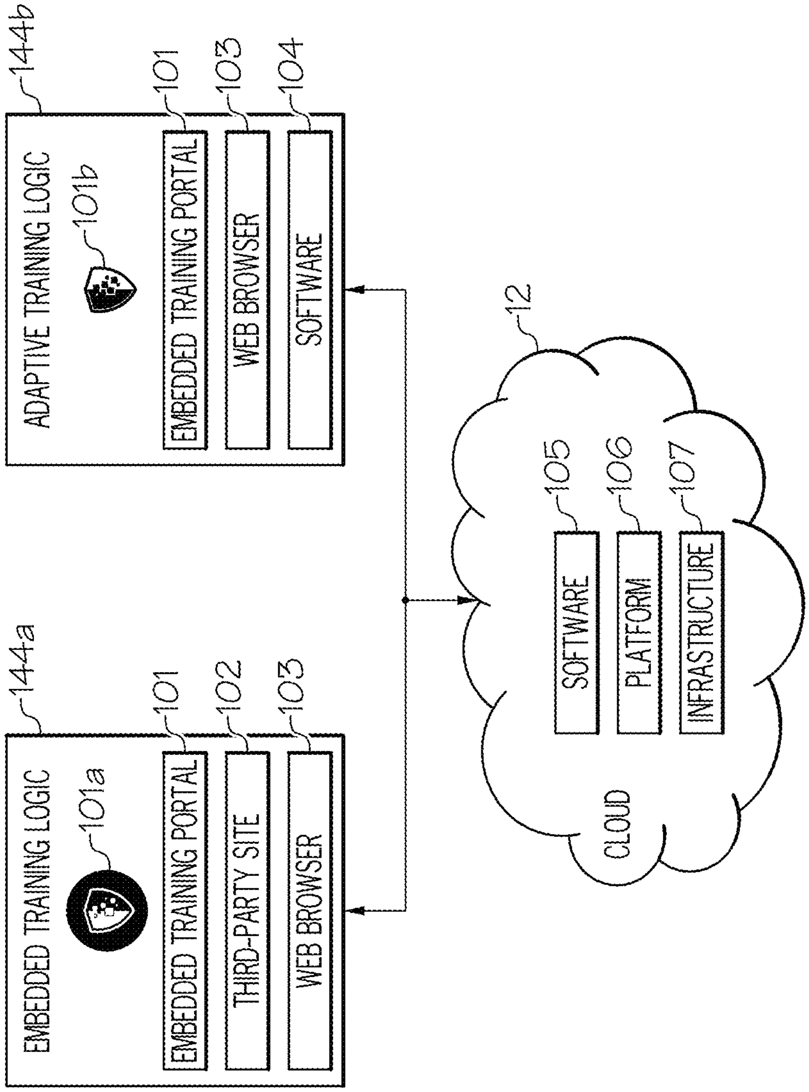
FIG. 1B depicts logical components for providing streamlined training, according to embodiments provided herein.
Figure 2A:
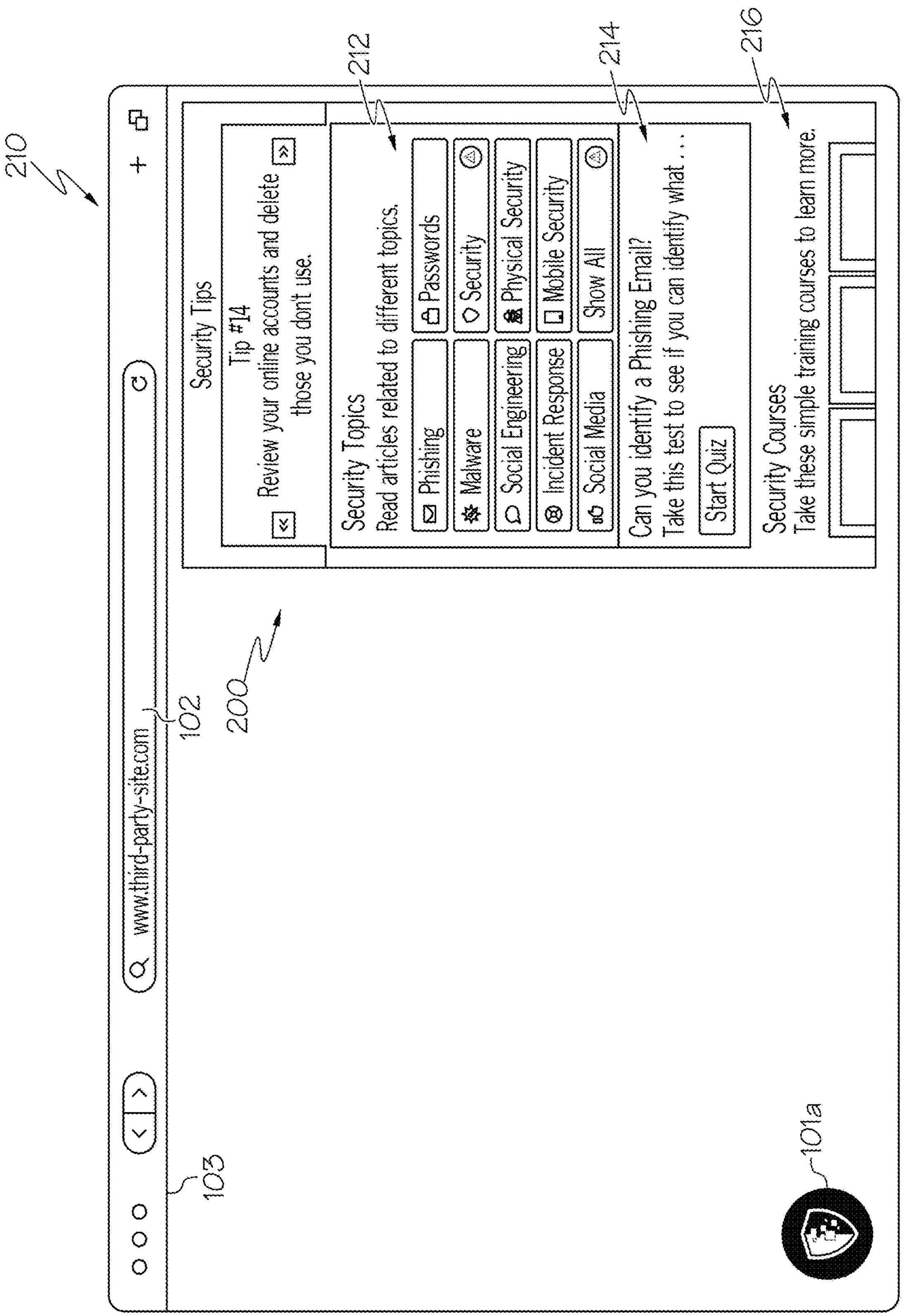
FIG. 2A depicts a user interface for providing streamlined training, according to embodiments provided herein.
Figure 7:
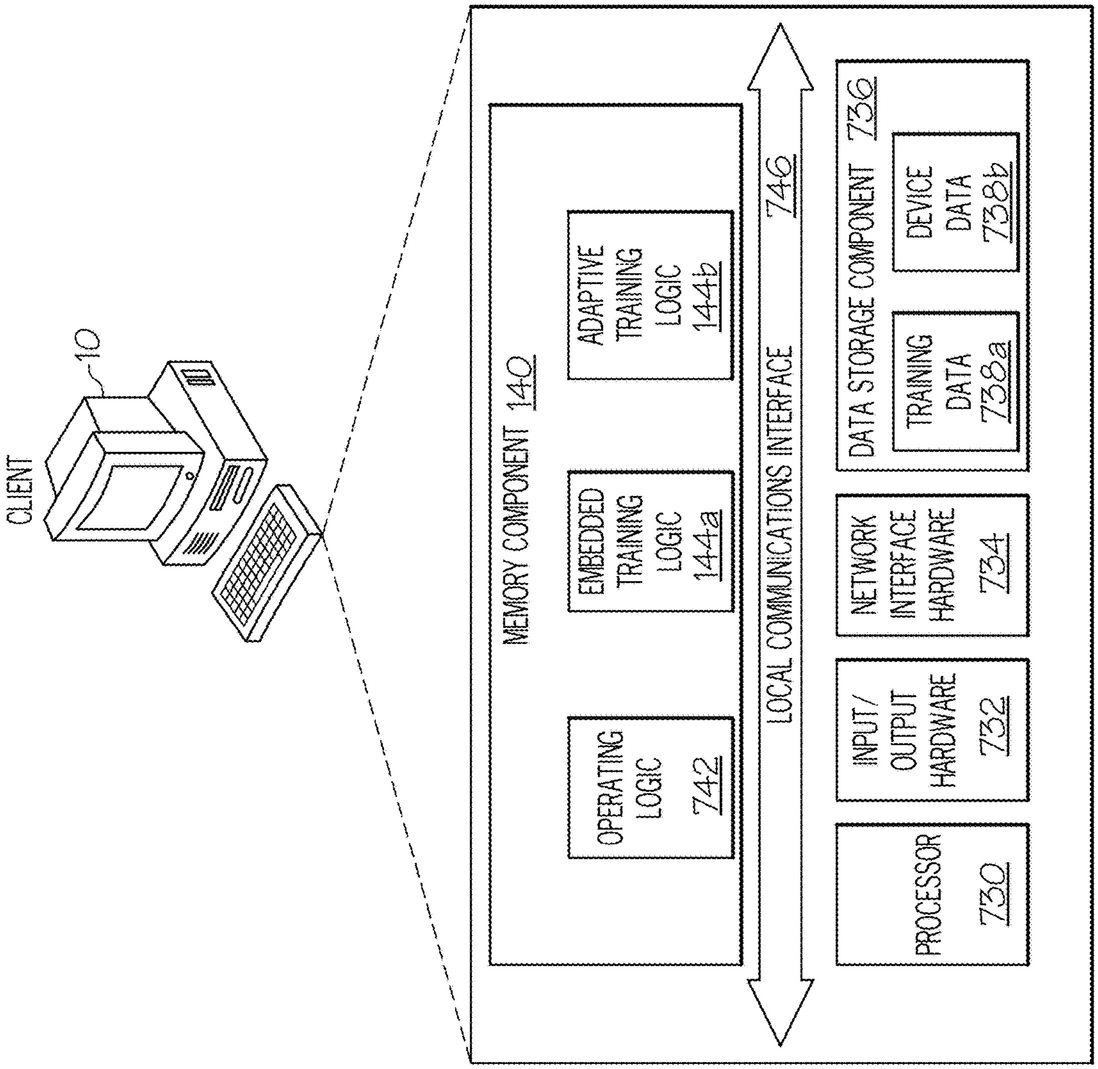
FIG. 7 depicts a client for providing streamlined training, according to embodiments provided herein.

FIG. 1B depicts logical components for providing streamlined training, according to embodiments provided herein. As also illustrated in FIG. 7, the client 10 may include a memory component 140 that may store logic, such as embedded training logic 144*a* and/or adaptive training logic 144*b*. The embedded training logic 144*a* may provide an embedded training option 101*a* for activating training from an embedded training portal 101 (such as depicted in FIG. 2A). The embedded training portal 101 may be provided via a third party site 102 and/or via a web browser 103.

Figure 2B:
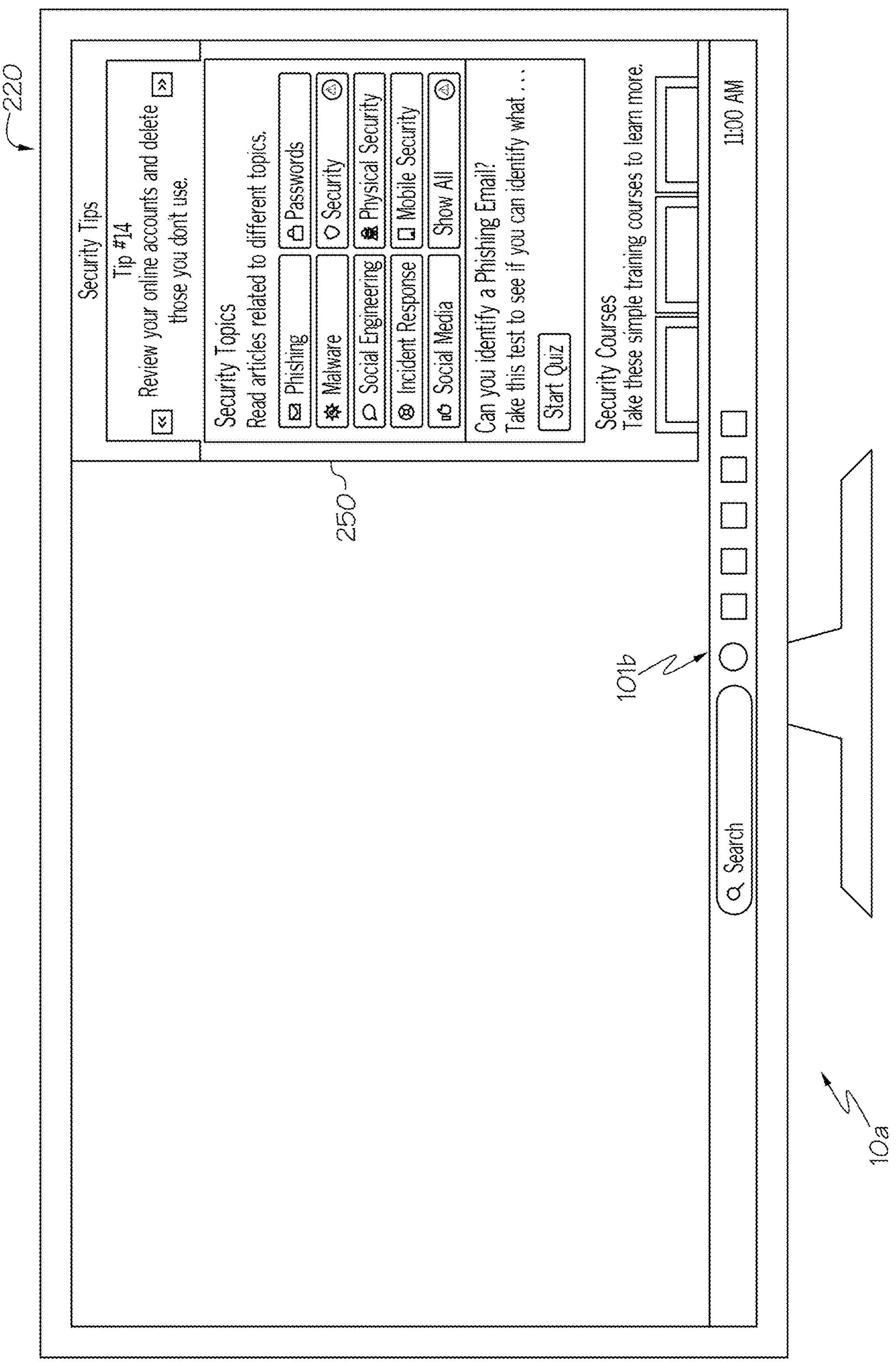
FIG. 2B depicts another user interface that includes a widget for providing streamlined training, according to embodiments provided herein.

Similarly, the adaptive training logic 144*b* may provide an adaptive training option 101*b*, which may be provided by the embedded training portal 101 (such as depicted in FIG. 2B). The embedded training portal 101 may provide access to training programs via a web browser 103 and/or downloaded software 104. Additionally, cloud-based software 105, a platform 106 and/or infrastructure 107 may be provided via the cloud 12. The code being executed/rendered via the web browser 103 or via the web browser 103 with the software 104 is hosted in the cloud and referenced as software 105. The software 105 represents the actual embedded training portal code writing, such as in JavaScript. The software 105 may interact with the software 104, which may be configured as system tray software (which may also be written in JavaScript and/or using Electron). It may be configured to embed the web browser 103 inside the system tray software 104. The platform 106 hosts the hosting code, such as via AWS CloudFront CDN. The infrastructure 107 represents the networking equipment used to run the platform 106.

Figure 1C:
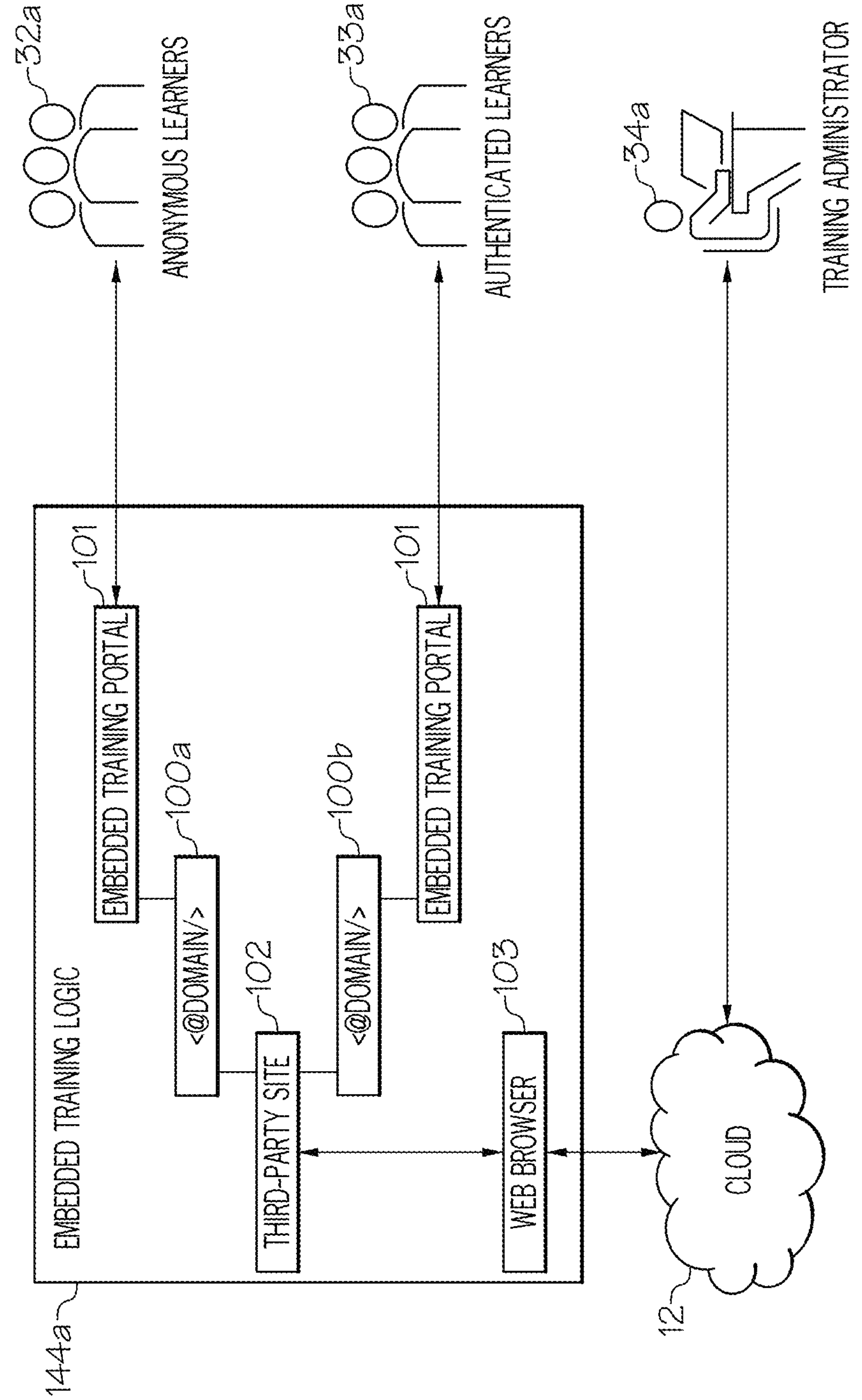
FIG. 1C depicts components of the embedded training logic, according to embodiments provided herein.

FIG. 1C depicts components of the embedded training logic 144*a*, according to embodiments provided herein. As illustrated, the embedded training logic 144*a* may provide the embedded training portal 101 to one or more anonymous learners 32*a* (using one or more respective clients 10). The embedded training portal 101 may be provided via a web domain 100*a* from a third party site 102. The third party site

102 may be provided via a web browser 103, provided by the cloud 12. A training administrator 34*a* may also have access to training data via the cloud 12.

Similarly, authenticated learners 33*a* may be provided the embedded training portal 101 via a different web domain 100*b* that requires the client 10 to determine an identity of the user accessing the embedded training portal 101. The web domain 100*b* may be provided via the third party site 102 via the web browser 103.

Figure 1D:
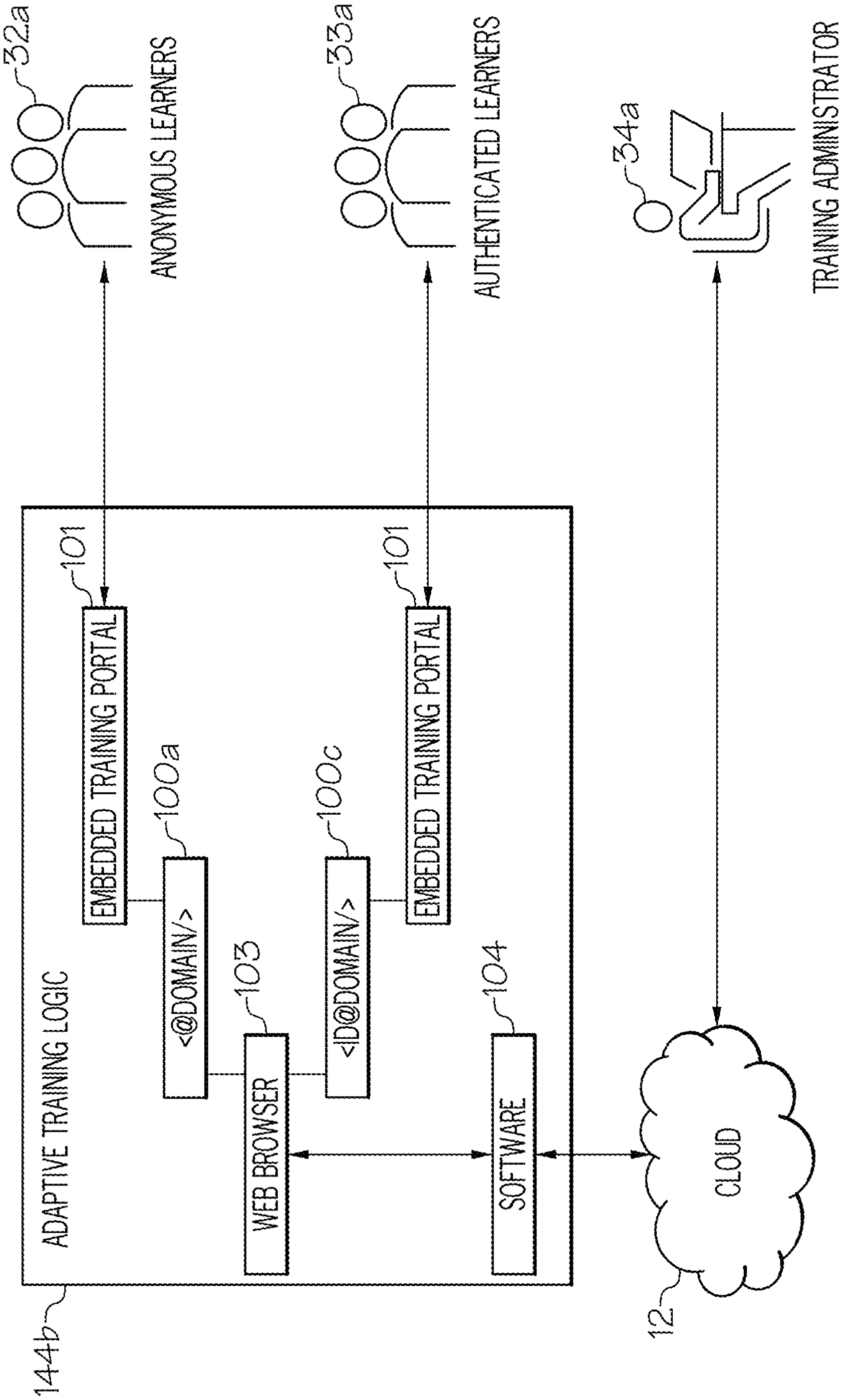
FIG. 1D depicts components of the adaptive training logic, according to embodiments provided herein.

FIG. 1D depicts components of the adaptive training logic 144*b*, according to embodiments provided herein. As illustrated, anonymous learners 32*a* access the embedded training portal 101 via the web domain 100*a*, which is provided by the web browser 103. While the embedded training logic 144*a* provides the third party site 102 via the web browser 103, the adaptive training logic 144*b* provides the web browser 103 via downloaded software 104. The downloaded software 104 may access the training platform and/or data via the cloud 12. Similarly, the training administrator 34*a* may access training data via the cloud 12.

FIG. 2A depicts a user interface 210 for providing streamlined training, according to embodiments provided herein. As illustrated, the user interface 210 may be provided by the web browser 103 and may provide access to a third party site 102. The user interface 210 may provide a security tips widget 200 (via the downloaded software 104), as well as an embedded training option 101*a* for launching the training portal. In some embodiments, the adaptive training logic 144*b* may be configured to automatically open and put up a training wall to monitor and account for training that the user accesses and/or completes. Specifically, these embodiments may be configured to interrupt daily workflows to require the user to participate in the training. While not explicitly depicted in FIG. 2A, the training portal may be accessed by anonymous users. However, if a user desires to be identified (and/or an employer desires that the user to be identified), the embedded training logic 144*a* may cause the client 10 to access a user identifier that is stored on the client 10.

In some embodiments, an administrator may set up a widget or script to collect and pass the user identifier to the third party site 102 via a configuration file. Specifically, some embodiments may be configured to authenticate a user upon logging into the client 10. The user may be prompted to enter a username and password. In such an embodiment, upon authentication into the client 10, the script may scrape the username from the login for passing to the third party site 102. Alternatively or in addition, some embodiments may include an email platform, such as Outlook®, Gmail®, etc. These embodiments may scrape the email address from the email platform for identifying the user with the third party site 102.

Some embodiments may be configured to cause a deployment/run script to query a domain controller for the user email address. If this is not successful, these embodiments may use fallback processes to detect an email address. Some embodiments may provide an administrator with options for web deployment, desktop deployments or SharePoint deployments.

In some embodiments, the client 10 may operate via a company virtual private network (VPN). The company may set up a VPN tunnel with the third party site 102 such that user credentials may be communicated through the tunnel. In some embodiments, MAC addresses may be stored by the third party site 102 to identify company-affiliated computers. Thus, scraping a user identifier from a program on the client 10 may be performed to identify the user to the third party site 102. As indicated above, the identifier may be an email address, employee number, name, social security number, or other user identifier.

Once the user is identified, embodiments of the embedded training portal 101 may activate a training wall and/or insert alerts on the widget that tells the users how many items they need to complete. Specifically, upon entering the training program, the embedded training portal 101 either by the third-party site 102 and/or the downloaded software 104 may be configured to restrict user access to all or a portion of the desktop or third-party site otherwise accessible by the client 10. This may be accomplished by enabling the training wall in the configuration for the widget. Embodiments may also configure the number of days to show the training wall before the deadline for training. Some embodiments may display the training wall but allow users to bypass access block until the deadline has been reached.

Additionally, the user may traverse the training program. With the user identification, the client 10 may report to the cloud 12 data related about the user interaction with the training platform (e.g., which programs were accessed, completion status, testing results, etc.). Thus, if the user leaves and returns to the training platform (on this client 10 and/or another client 10) and is again identified by that client 10, the user may seamlessly return to the same point in the training.

As illustrated, the security tips widget 200 may provide a security topics section 212 for the user to investigate various security topics. The articles provided in the security topics section 212 may be part of the training provided by the third party site 102 and/or the articles may be independently provided independently from the third party site 102. As an example, embodiments of the downloaded software 104 may be configured to determine topics of training provided by the third party site 102. This determination may be made from information sent by the third party site 102 and/or via a scanning of materials on the third party site 102. Regardless, the downloaded software 104 may be configured to cause the client 10 to access one or more articles associated with the topics provided by the third party site 102. These articles may be from a repository provided to the security tips widget 200, may be provided by the third party site 102, and/or may be accessed via the internet or other public repository.

Also provided in the user interface 210 is a quiz section 214. Similar to the security topics section 212, the quiz section 214 may be a quiz that may or may not relate to the training content provided by the third party site 102. Specifically, some embodiments may be configured to provide merely a security/phishing quiz that may not have any relation to the third party site 102. However, some embodiments may be configured to determine the content of the training provided via the third party site 102 and select (or create) a quiz that tests knowledge of the third party site 102. In some embodiments, the quiz may be customized to the actions the user takes. As an example, if the downloaded software 104 detects that the user often opens an email and immediately opens images or selects links, the quiz may have questions associated with deterring that type of risky behavior. Regardless, in embodiments where the quiz provided by the downloaded software 104 is custom to the training provided via the third party site 102, the quiz may be part of the requirements of the training and/or may simply be a practice quiz to make sure that the user completes the training.

Similarly, the security tips widget 200 may also provide a security courses section 216. The security courses section 216 may again include courses that that relate to the training provided by the third party site 102 and/or may be courses associated with actions the user takes. In some embodiments, the courses are standard and/or may be selected based on the user's performance on the quiz.

Regardless, in response to selection of the embedded training option 101*a*, the training may be provided by the third party site 102. While embodiments discussed above indicate that the downloaded software 104 may be provided in response to content provided by the third party site 102, some embodiments may customize the training data provided by the third party site 102, based on user interaction with the security tips widget 200. More specifically, if the user has interacted with the articles, quizzes, and security courses, those results may be provided to the third party site 102, which may customize the training based on the user's current security understanding. In some embodiments, a determination may be made whether the user needs training or what level of training should be required based on at least these metrics. In some embodiments, the downloaded software 104 may similarly monitor usage by the user to make this determination.

It will be understood that some embodiments may be configured such that the security tips widget 200 may launch upon a determination that the user accesses the third party site 102. However, some embodiments may be configured such that the security tips widget 200 causes the client 10 to open third party site 102 to assist in the training.

FIG. 2B depicts another user interface 220 that includes a security tips widget 250 for providing streamlined training, according to embodiments provided herein. As illustrated, the user interface 220 may be provided by the platform 106 on the client 10*a* from the cloud 12. The user interface 220 may additionally provide the adaptive training option 101*b*. In response to selection of the adaptive training option 101*b*, the downloaded software 104 may launch the security tips widget 250 for providing training to the user. As described above, the downloaded software 104 may be configured to access one or more registries of the client 10 to determine a user identifier of the user. This user identifier may include an email address, name, phone number, employee number, USERID (which may be any string of characters that has been assigned as an identifier of the user), and/or other identifier that is associated with the user and/or the client 10 for identifying the user. Once the user has been identified, the user may participate in the training via the security tips widget 250.

As will be understood, FIG. 2B depicts a stand-alone widget in the security tips widget 250 that operates independently from any third party site 102. Specifically, the embodiment provided in FIG. 2A provides the security tips widget 200 that communicates data directly with the third party site 102 that provides the training, the security tips widget 250 of FIG. 2B may operate without the need of navigating to the third party site 102. This may still use data from the third party site 102 and/or may simply operate independently to provide the training.

Figure 2C:
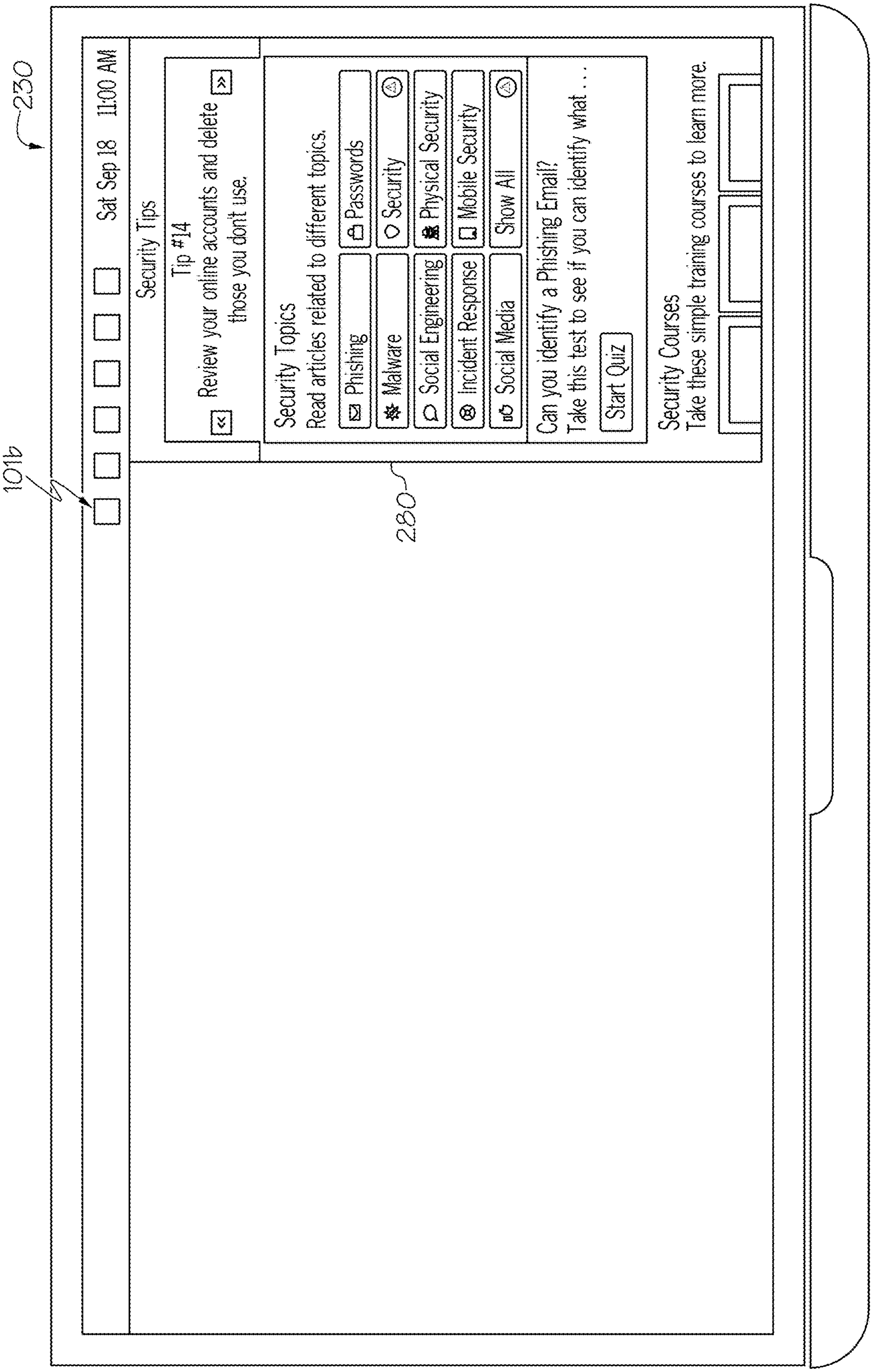
FIG. 2C depicts another user interface for a client that includes a widget for providing streamlined training, according to embodiments provided herein.

FIG. 2C depicts another user interface 230 for a client 10*n* that includes a security tips widget 280 for providing streamlined training, according to embodiments provided herein. As illustrated, the client 10*n* may provide a user interface 230 similar to the user interface 220 of FIG. 2B. However, the user interface 230 may be provided by the infrastructure 107 (FIG. 1B). Also, in response to a user selection of the adaptive training option 101*b*, the downloaded software 104 may provide the widget for training.

Figure 3:
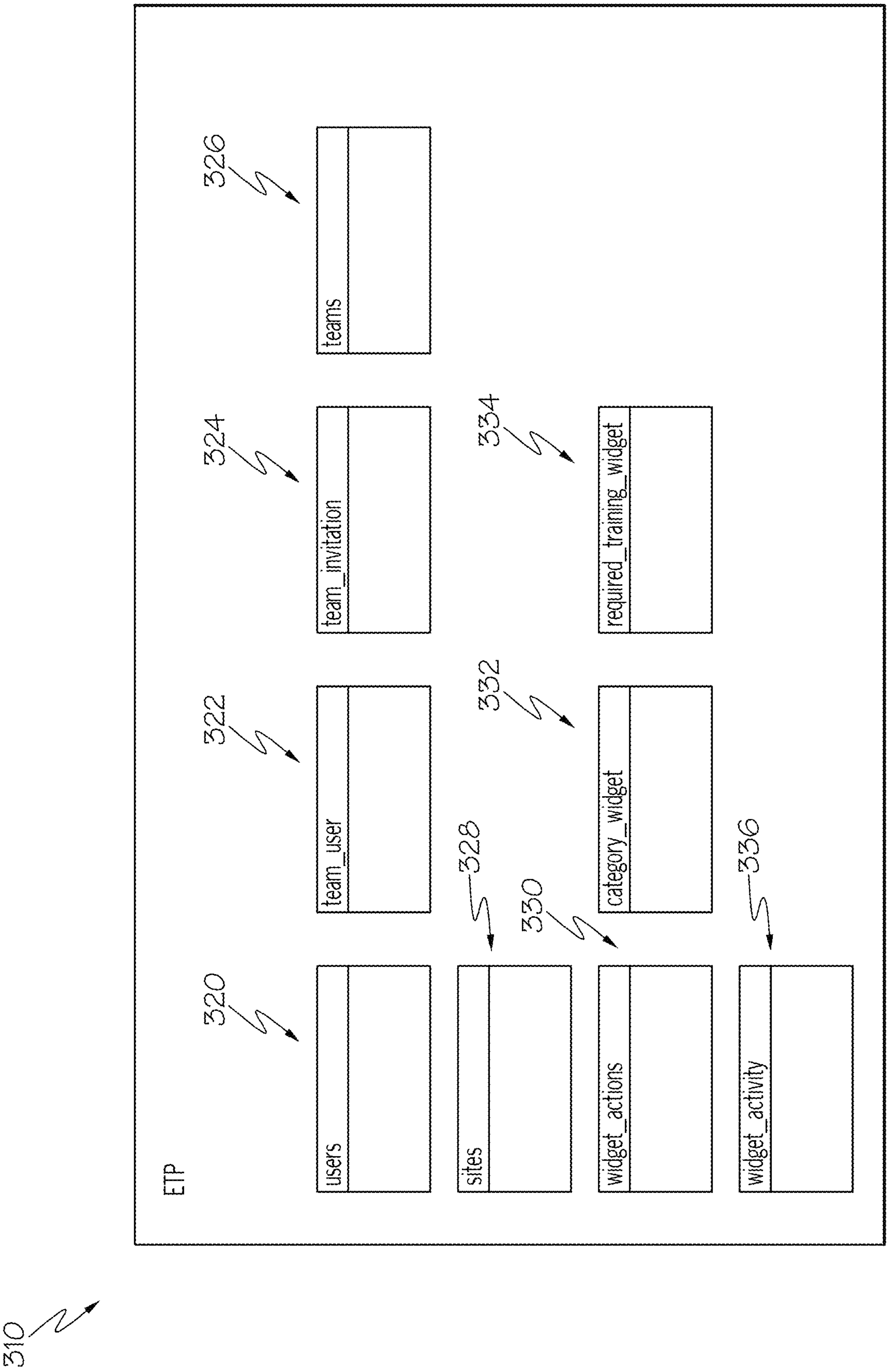
FIG. 3 depicts an administrator portal for providing streamlined training, according to embodiments provided herein.

FIG. 3 depicts an administrator portal 310 for providing streamlined training, according to embodiments provided herein. The administrator portal 310 may provide a user interface that serves as a central hub for managing various aspects of training within an organization. Within this portal, several functionalities and components are made available to streamline the training process and enhance organizational efficiency. A users component 320 may be configured to provide a list of users registered for training. These users may be administrators and/or consumers of the training. The list includes user details for easy identification and management. Also provided is a team users component 322. The team users component 322 may be configured to provide an organizational structure to the users. Specifically, based on the identified team for a user, a user may have different requirements for training. As an example, a manager may require different training than a sales person. As such, organizing the users into teams allows a system administrator easily define required training for each team. The administrator portal 310 also offers a dedicated section for managing users within specific teams or groups. This feature allows administrators to organize users into teams for collaborative reporting and deployments.

A team invitations component 324 may be configured for sending and tracking team invitations for training and/or other events. Administrators can invite users to join specific teams, ensuring that team structures align with organizational needs and objectives. Similarly, a teams component 326 may provide options to view and manage a list of existing teams. Each team may have a unique identity, purpose, and/or composition, contributing to efficient team-based training initiatives. A sites component 328 may identify deployments by domain, usage and billing for the portal are also tracked and organized by site. Specifically, the sites component 328 may include a listing of third party sites 102 that provide the various training to the users. A widget actions component 330 may also be included for providing an overview of available widget actions that are provided to users and/or teams of users.

The administrator portal 310 also includes a widget categories component 332, which may categorize widgets based on functionality and/or content type. This categorization helps administrators and trainers easily identify and select appropriate widgets for specific training modules, ensuring content relevance. A required training widgets component 334 may provide widgets that are mandatory for specific end users of a specific site and/or for teams of users. Administrators can adjust delivery mode for a specific sites to ensure that critical training content is completed. An activities component 336 may also be provided, which tracks and logs user interactions with widgets during training sessions. This component provides valuable data on user engagement, progress, and performance, aiding in the assessment of training effectiveness and customization of future content.

In summary, the administrator portal 310, as depicted in FIG. 3, serves as a comprehensive tool for managing training activities within an organization. It offers functionalities ranging from user management to widget customization, empowering administrators to create a tailored and efficient training environment. This innovation contributes to enhancing organizational learning processes and optimizing training outcomes.

Figure 4A:
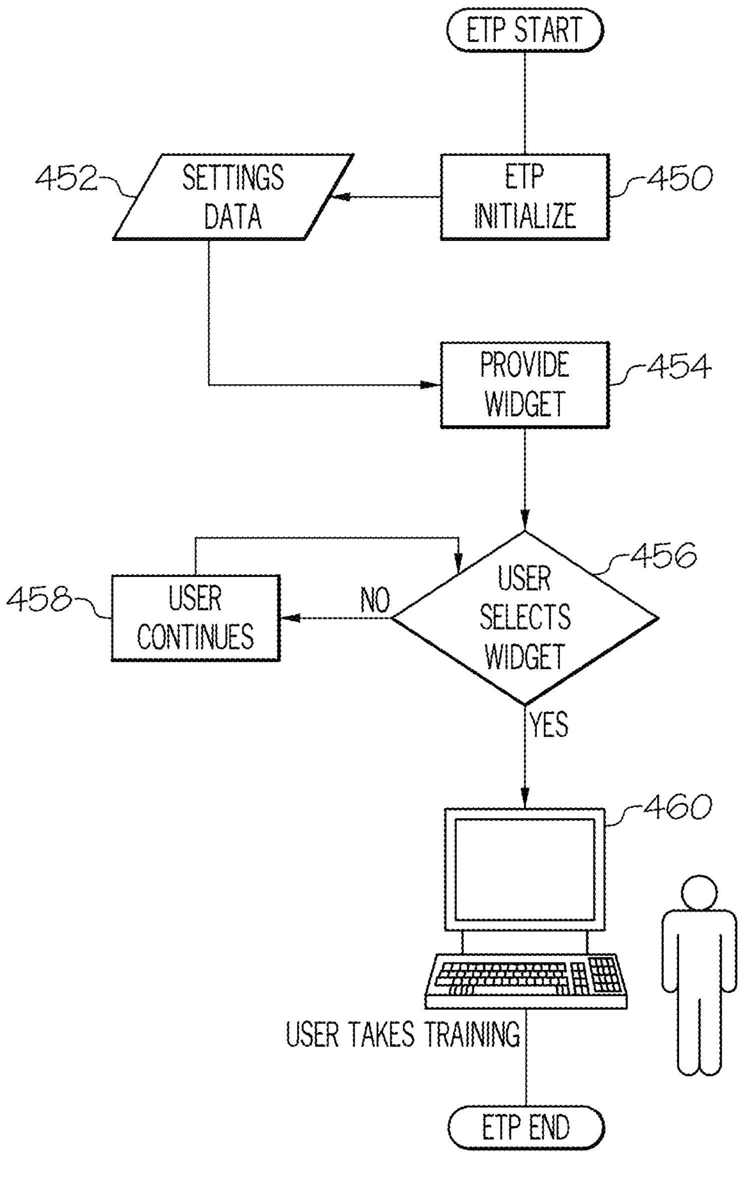
FIG. 4A depicts a flowchart for the embedded training logic to provide streamlined training, according to embodiments provided herein.

FIG. 4A depicts a flowchart for the embedded training logic 144*a* to provide streamlined training, according to embodiments provided herein. As illustrated in block 450, the embedded training logic 144*a* may be initialized, which may include identification of the user. If adaptive training is activated, embodiments may receive a training number (provided to the user) and a training email (registered for the user), along with additional data. With this information, the embedded training logic 144*a* causes the client 10 to ping the cloud 12, which stores the data and data structures provided in FIG. 3. The cloud 12 responds to the ping with the correct widget settings and any required training for that user. In some embodiments, the cloud 12 returns a list of identifiers of required training for everyone that is part of the site/organization along with an additional identifiers of completed training by that specific user. The client 10 may hide, provide, and/or flag the training that is required based on what is returned by the cloud 12.

In block 452, settings data may be loaded for providing and monitoring training. In block 454, the widget may be provided. In block 456, a determination may be made regarding whether the user selects the widget. If not, in block 458, the user continues with other work. If in block 456, the use selects the widget, in block 460, the training may be provided to the user.

Figure 4B:
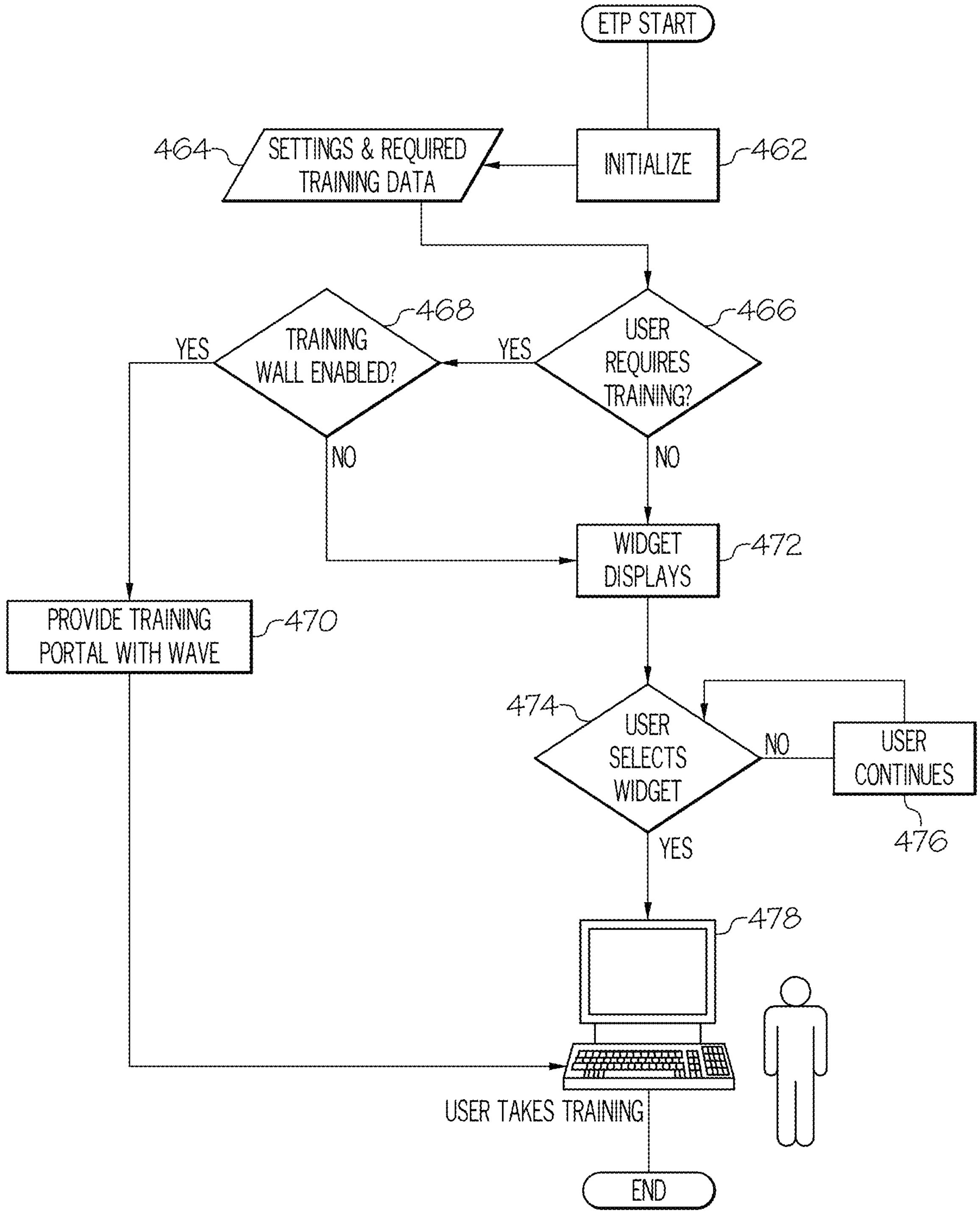
FIG. 4B depicts a flowchart for the adaptive training logic to provide streamlined training, according to embodiments provided herein.

FIG. 4B depicts a flowchart for the adaptive training logic 144*b* to provide streamlined training, according to embodiments provided herein. As illustrated in block 462, the adaptive training logic 144*b* may initialize. In block 464, settings and required training data may be loaded. This may include identification of the user. As described above, identifying the user may include accessing a third party application via a widget or script. As an example, if a user logs into a client 10 that is a work computer, the client 10 may require the user to identify himself/herself in order to access the operating system and/or network files. Thus, embodiments provided herein may simply query the security software that makes these determinations regarding (a) is the user authenticated; and (b) what is the authenticated user's identifier. If the user is authenticated, embodiments provide the received identifier to the cloud 12 to retrieve the training data.

In block 466, a determination may be made regarding whether the user requires training. If so, at block 468, a determination may be made regarding whether the training wall is to be enabled. If so, at block 470, the adaptive training logic 144*b* may cause the client 10 to provide a training portal with the wall. In some embodiments, the training portal may be a fully engaged program with transparent background covering the entire display to prevent other activity by the user. The process proceeds to block 478 where the user participates in the training.

If at block 468, the training wall is not enabled or at block 466 the user does not require training, the process proceeds to block 472, where the widget is provided for display. In block 474, a determination is made regarding whether the user selected the widget. If not, the user may continue his/her work in block 476. If the user selects the widget, the user may participate in the training at block 478.

Figure 5:
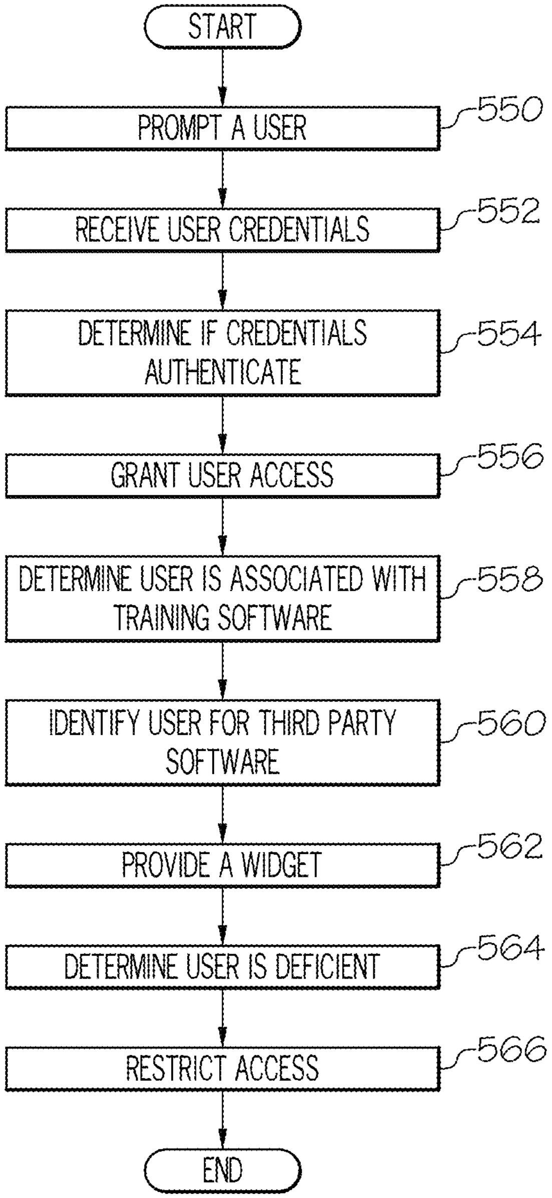
FIG. 5 depicts a flowchart for streamlined training, according to embodiments provided herein.

FIG. 5 depicts a flowchart for streamlined training, according to embodiments provided herein. As illustrated in block 550, a user may be prompted for user credentials to access an organization-managed device. In block 552, the user credentials may be received. In block 554, a determination may be made regarding whether the user credentials authenticate an authorized user of the organization-managed device. In response to determining that the user credentials authenticate an authorized user of the organization-managed device, blocks 556 to 566 may be performed. Specifically, in block 556, the user access may be granted to the organization-managed device. In block 558, a determination may be made that the user is associated with third party training software. In block 560, automatically and without user intervention the user may be authenticated for the third party training software. In block 562, an interface may be provided for the third party training software to the user. In block 564, a determination may be made that the user is deficient on training. In block 566, in response to determining that the user is deficient on training, access to other third party software provided via the organization-managed device may be restricted. More specifically, some embodiments may actively disable the software, remove the software from the client 10, and/or perform other measure to physically restrict user access to the software.

Figure 6:
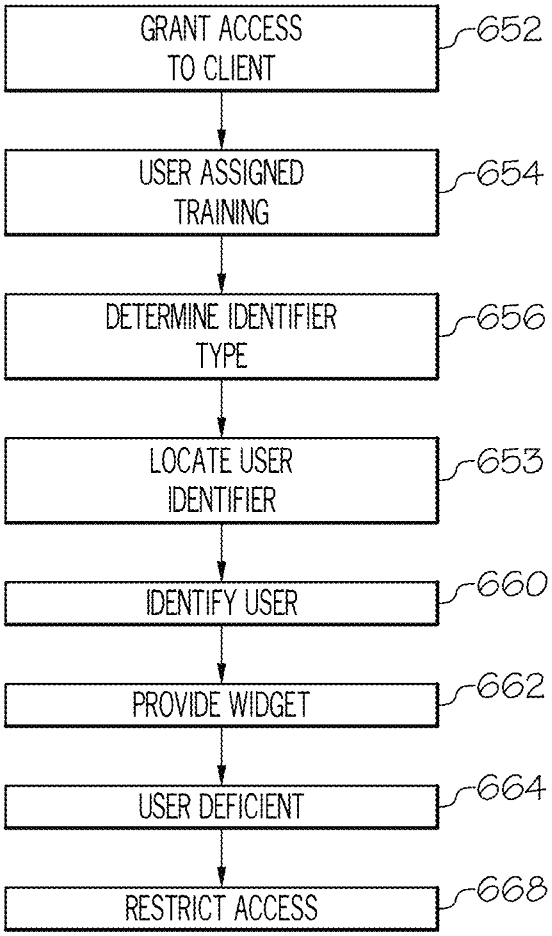
FIG. 6 depicts another flowchart for providing streamlined training, according to embodiments provided herein.

FIG. 6 depicts another flowchart for providing streamlined training, according to embodiments provided herein. As illustrated in block 652, a user may be granted access to a client 10, such as an organization-managed device. In block 654, a determination may be made that the user has been assigned third party training software. As discussed above, a user being assigned to third party training software means that the user is required to complete a training course that is provided by the third party training software. In block 656, a determination may be made regarding an identifier type for the third party training software. Specifically, different third party training software may require different identifiers. Some may require an email address, while some may require an employee number. In block 658, a user identifier associated with another portion of the organization-managed device that complies with the identifier type for the third party training software may be located. In block 660, automatically and without user intervention the user identifier may be utilized to identify the user for the third party training software. This may include the client 10 capturing the user identifier and sending the user identifier to the cloud 12, and/or may include the cloud 12 verifying the user's identity. In block 662, a training widget to the user may be provided to the user. In block 664, a determination may be made that the user is deficient on training. In block 668, in response to determining that the user is deficient on training, access to other third party software provided via the organization-managed device may be physically restricted from the user. Specifically, some embodiments may lock the user display from providing anything except the training interface. Some embodiments may allow the display of the desktop, but selection of a new application will be blocked. Some embodiments may be configured to disable the cursor, unless on the training interface. Other mechanisms for physically restricting access to the user may also be provided.

FIG. 7 depicts a client 10 for providing streamlined training, according to embodiments provided herein. As illustrated, the client 10 includes a processor 730, input/output hardware 732, a network interface hardware 734, a data storage component 736 (which stores training data 738*a*, device data 738*b*, and/or other data), and a memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable mediums may reside within the client 10 and/or external to the client 10.

The memory component 140 may store operating logic 742, the embedded training logic 144*a* and the adaptive training logic 144*b*. Each of these logic components may include a plurality of different pieces of logic, each of which may be embodied as a computer program, firmware, and/or hardware, as an example. A local communications interface 746 is also included in FIG. 7 and may be implemented as a bus or other communication interface to facilitate communication among the components of the client 10.

The processor 730 may include any processing component operable to receive and execute instructions (such as from a data storage component 736 and/or the memory component 140). As described above, the input/output hardware 732 may include and/or be configured to interface with speakers, microphones, and/or other input/output components.

The network interface hardware 734 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the client 10 and other computing devices.

The operating logic 742 may include an operating system and/or other software for managing components of the client 10. As discussed above, the embedded training logic 144*a* may be configured to cause the processor 730 to provide training via a web portal, as described herein. The adaptive training logic 144*b* may be configured to cause the processor 730 to provide training via a desktop widget and/or other desktop application on the client 10.

It should be understood that while the components in FIG. 7 are illustrated as residing within the client 10, this is merely an example. In some embodiments, one or more of the components may reside external to the client 10 or within other devices, such as the server 12 depicted in FIG. 1A. It should also be understood that, while the client 10 is illustrated as a single device, this is also merely an example. In some embodiments, the embedded training logic 144*a* and/or the adaptive training logic 144*b* may reside on different computing devices.

As an example, one or more of the functionalities and/or components described herein may be provided by the client 10 and/or the server 12. Depending on the particular embodiment, any of these devices may have similar components as those depicted in FIG. 7. To this end, any of these devices may include logic for performing the functionality described herein.

Additionally, while the client 10 is illustrated with the embedded training logic 144*a* and the adaptive training logic 144*b* as separate logical components, this is also an example. In some embodiments, a single piece of logic may provide the described functionality. It should also be understood that while the embedded training logic 144*a* and the adaptive training logic 144*b* are described herein as the logical components, this is also an example. Other components may also be included, depending on the embodiment.

As illustrated above, various embodiments for providing streamlined training are disclosed. As discussed above, there are currently issues regarding improving the technical accessibility of training, while at the same time providing electronic training platforms that are both secure and have the ability to track learners. Embodiments provided herein solve these and other technical problems by providing an electronic platform that tracks users by computing device and email address. This improves the technical field by allowing users to not have to log into a training platform, but instead have a seamless, integrated experience to electronic training. Additionally, embodiments provided herein cannot be performed by the human mind with pen and paper because the technology is necessarily rooted in computer networking. Specifically, a purpose of this disclosure is to provide tracking and seamless authentication of computerized training. It would be impossible for a human to track and authenticate a training user.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for providing streamlined training. It should also be understood that these embodiments are merely exemplary and are not intended to limit the scope of this disclosure.

What is claimed is:

1. A system for providing streamlined training, the system comprising:
- a cloud device for providing third party training software to a user; and
- a client device that includes a memory component and a processor, wherein the memory component stores logic that causes the processor to perform at least the following:
  - prompt the user for user credentials to access the client device, wherein the user credentials include a user identifier;
  - receive the user credentials;
  - determine whether the user credentials authenticate the user as an authorized user of the client device;
  - in response to determining that the user credentials authenticate the user:
    - grant the user with access to the client device;
    - determine that the user has been assigned the third party training software to complete a training program;
    - automatically and without user intervention, identify the user with the user identifier for using the third party training software;
    - provide a training widget to the user;
    - determine that the user has not completed training; and
    - in response to determining that the user has not completed training, restrict access to other third party software provided via the client device.

2. The system of claim 1, wherein the user identifier includes at least one of the following: an email address, employee number, name, social security number, or a USERID.

3. The system of claim 1, wherein in response to determining that the user has not completed training, the logic further causes the system to perform at least the following:
- determine a required training module for the user;
- provide the required training module of the user;
- receive data that the user has completed the required training module; and
- record completion of the required training module and grant access to the other third party software.

4. The system of claim 1, wherein in response to providing the training widget to the user, the logic further causes the system to implement a training wall that restricts user access to the other third party software until training is complete.

5. The system of claim 1, wherein the training widget is provided with a third party site and wherein the training widget alters data provided to the user, based on data received from the third party site.

6. The system of claim 1, wherein the training widget is provided as a desktop application.

7. The system of claim 1, wherein the training widget is provided in response to a user selection of a training option and wherein the training option is provided in at least one of the following: a desktop of the client device or a web browser.

8. A method for providing streamlined training, the method comprising:

granting, by a computing device, a user with access to an organization-managed device;

determining, by the computing device, that the user has been assigned third party training software;

determining, by the computing device, an identifier type for the third party training software;

locating, by the computing device, a user identifier associated with another portion of the organization-managed device that complies with the identifier type for the third party training software;

automatically and without user intervention by the computing device, using the user identifier to identify the user for the third party training software;

providing, by the computing device, a training widget to the user;

determining, by the computing device, that the user has not completed training; and in response to determining that the user has not completed training, restricting, by the computing device, access to other third party software provided via the organization-managed device.

9. The method of claim 8, wherein the identifier type includes at least one of the following: an email address, employee number, name, social security number, or a USERID.

10. The method of claim 8, further comprising, in response to determining that the user has not completed training:

determining a required training module for the user;

providing the required training module of the user;

receiving data that the user has completed the required training module; and recording completion of the required training module and grant access to the other third party software.

11. The method of claim 8, further comprising implementing a training wall that restricts user access to the other third party software until training is complete.

12. The method of claim 8, wherein the training widget is provided with a third party site and wherein the training widget alters data provided to the user, based on data received from the third party site.

13. The method of claim 8, wherein the training widget is provided as a desktop application.

14. The method of claim 8, wherein the training widget is provided in response to a user selection of a training option and wherein the training option is provided in at least one of the following: a desktop of a client device or a web browser.

15. A non-transitory computer-readable storage medium for providing streamlined training, the non-transitory computer-readable storage medium comprising logic, that when executed by an organization-managed device, causes the organization-managed device to perform at least the following:

determine that a user has been assigned third party training software;

determine an identifier type for the third party training software;

locate a user identifier associated with another portion of the organization-managed device that complies with the identifier type for the third party training software;

automatically and without user intervention use the user identifier to identify the user for the third party training software;

provide a training widget to the user;

determine that the user has not completed training; and in response to determining that the user has not completed training, restrict access to other third party software provided via the organization-managed device.

16. The non-transitory computer-readable storage medium of claim 15, wherein the identifier type includes at least one of the following: an email address, employee number, name, social security number, or a USERID.

17. The non-transitory computer-readable storage medium of claim 15, wherein the logic further causes the organization-managed device to perform at least the following:

in response to determining that the user has not completed training:

determine a required training module for the user;

provide the required training module of the user;

receive data that the user has completed the required training module; and record completion of the required training module and grant access to the other third party software.

18. The non-transitory computer-readable storage medium of claim 15, wherein the logic further cause the organization-managed device to implement a training wall that restricts user access to the other third party software until training is complete.

19. The non-transitory computer-readable storage medium of claim 15, wherein the training widget is provided with a third party site and wherein the training widget alters data provided to the user, based on data received from the third party site.

20. The non-transitory computer-readable storage medium of claim 15, wherein the training widget is provided in response to a user selection of a training option and wherein the training option is provided in at least one of the following: a desktop of the organization-managed device or a web browser.

* * * * *